United States Patent
Campbell

(10) Patent No.: US 11,363,570 B1
(45) Date of Patent: Jun. 14, 2022

(54) SYSTEM AND METHOD FOR PROVIDING REAL TIME AUDIO CONTENT TO FLYING CAMERA VIDEO

(71) Applicant: Ambarella International LP, Santa Clara, CA (US)

(72) Inventor: Jeffery Campbell, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 713 days.

(21) Appl. No.: 14/925,351

(22) Filed: Oct. 28, 2015

Related U.S. Application Data

(63) Continuation-in-part of application No. 14/873,871, filed on Oct. 2, 2015, now abandoned.

(51) Int. Cl.
*H04W 72/04* (2009.01)
*H04B 1/40* (2015.01)
*H04L 69/16* (2022.01)
*H04N 5/77* (2006.01)
*H04N 7/18* (2006.01)

(52) U.S. Cl.
CPC .......... *H04W 72/0406* (2013.01); *H04B 1/40* (2013.01); *H04L 69/16* (2013.01); *H04N 5/772* (2013.01); *H04N 7/185* (2013.01)

(58) Field of Classification Search
CPC ... H04W 72/0406; H04N 7/185; H04N 5/772; H04B 1/40; H04L 69/16
IPC ................ H04W 72/0406; H04N 7/185,5/772; H04B 1/40; H04L 69/16
See application file for complete search history.

(56) References Cited

U.S. PATENT DOCUMENTS

| | | | |
|---|---|---|---|
| 6,710,815 B1* | 3/2004 | Billmaier | H04H 20/18 348/485 |
| 2004/0008253 A1* | 1/2004 | Monroe | G08B 13/19641 348/143 |
| 2010/0096491 A1* | 4/2010 | Whitelaw | A63K 3/00 244/15 |
| 2014/0260924 A1* | 9/2014 | Skillings | G10H 1/0058 84/742 |
| 2014/0355947 A1* | 12/2014 | Slamecka | H04N 5/91 386/201 |
| 2016/0009371 A1* | 1/2016 | Atzert | B64C 1/36 244/118.1 |

(Continued)

*Primary Examiner* — Nasim N Nirjhar
(74) *Attorney, Agent, or Firm* — Christopher P. Maiorana, PC

(57) ABSTRACT

An apparatus includes a transceiver circuit and a first controller circuit. The transceiver circuit may be configured to receive an uplink channel and transmit a downlink channel. The first controller circuit configured to (i) control operation of an unmanned aerial vehicle and a camera in response to commands received via the uplink channel, (ii) capture video data from the camera, (iii) generate a first encoded video stream having a first resolution and a second encoded video stream having a second resolution, (iv) store the first encoded video stream with time stamp information on a storage medium, (v) transmit the second encoded video stream and the time stamp information via the downlink channel, (vi) receive encoded audio information associated with previously transmitted time stamp information via the uplink channel, and (vii) combine the encoded audio information with the first encoded video stream stored on the storage medium using the associated time stamp information.

19 Claims, 9 Drawing Sheets

(56) References Cited

U.S. PATENT DOCUMENTS

2017/0053674 A1\* 2/2017 Fisher .................... H04N 21/84

\* cited by examiner

SYSTEM AND METHOD FOR PROVIDING REAL TIME AUDIO CONTENT TO FLYING CAMERA VIDEO

This application relates to U.S. Ser. No. 14/873,871, filed Oct. 2, 2015, which is incorporated by reference in its entirety.

FIELD OF THE INVENTION

The present invention relates to remotely operated cameras generally and, more particularly, to a system and method for providing real time audio content to flying camera video.

BACKGROUND OF THE INVENTION

An unmanned aerial vehicle (UAV) is an aircraft without a human pilot aboard. UAVs are commonly known as drones. UAVs are also referred to as remotely piloted aircraft (RPA) by the International Civil Aviation Organization (ICAO). Unmanned aerial vehicles (UAVs) are commonly equipped with high resolution video cameras. In many instances, a first, high definition (HD) video sequence is recorded and stored locally, and a second, lower resolution video sequence is streamed via WiFi or RF channel to a base station or controller. The pilot can then view the lower resolution video in real time.

Video created using a camera equipped drone (i.e., a flying camera) is typically recorded without audio because the platform on which the camera is mounted is inherently noisy. The motors driving the propellers of a propeller system are noisy, as are the spinning propellers themselves. Audio capture devices mounted on the platform are typically unable to cancel the ambient noise to capture any usable audio from the scene in view of the camera.

It would be desirable to implement a system and method for providing real time audio content to flying camera video.

SUMMARY OF THE INVENTION

The present invention concerns an apparatus including a transceiver circuit and a first controller circuit. The transceiver circuit may be configured to receive an uplink channel and transmit a downlink channel. The first controller circuit configured to (i) control operation of an unmanned aerial vehicle and a camera in response to commands received via the uplink channel, (ii) capture video data from the camera, (iii) generate a first encoded video stream having a first resolution and a second encoded video stream having a second resolution, (iv) store the first encoded video stream with time stamp information on a storage medium, (v) transmit the second encoded video stream and the time stamp information via the downlink channel, (vi) receive encoded audio information associated with previously transmitted time stamp information via the uplink channel, and (vii) combine the encoded audio information with the first encoded video stream stored on the storage medium using the associated time stamp information.

The objects, features and advantages of the present invention include providing a system and method for adding real time audio content to flying camera video that may (i) add audio content to precaptured video content stored on a drone, (ii) add audio content to precaptured video content stored on a remote server, (iii) use time stamps to synchronize audio and video content recorded separately, (iv) provide contemporaneous narration of captured video sequences, (v) eliminate post production processing to add description and/or music to flying camera video, (vi) capture emotions and/or thoughts of a pilot in real time, (vii) save time and expense, and/or (viii) be implemented in one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
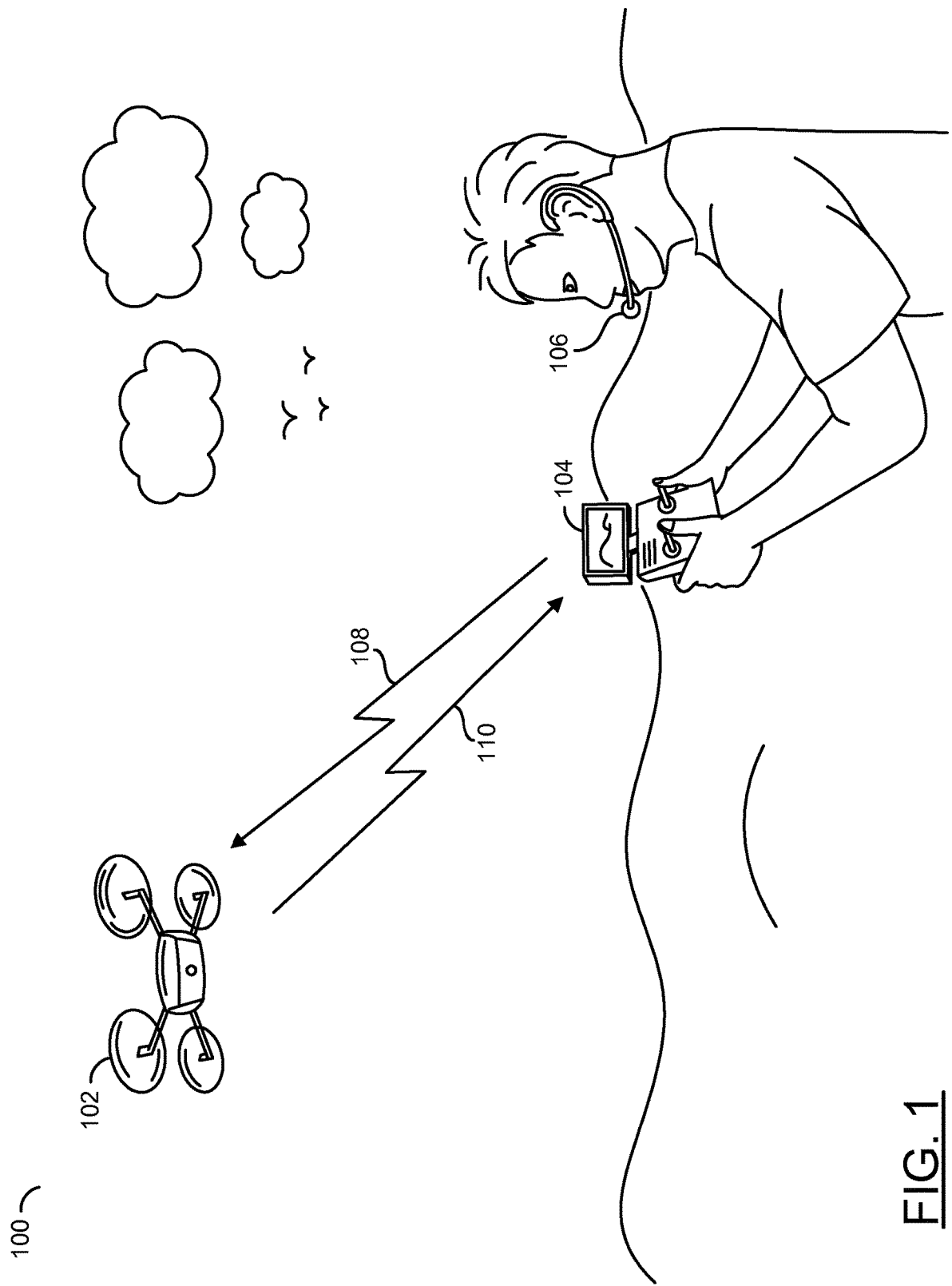
FIG. 1 is a diagram of a flying camera system in accordance with an example embodiment of the invention.

Referring to FIG. 1, a diagram of a system 100 in accordance with an example embodiment of the invention is shown. In various embodiments, an encoded audio channel is supplied that may be mixed (combined) into an encoded video channel generated in real time on board a flying camera, drone, or unmanned aerial vehicle (UAV). The addition of the encoded audio channel generally enhances a multi-media file (or program) generated by the flying camera in real time.

In various embodiments, the system 100 may comprise a flying camera 102, a controller (or base station) 104, and a microphone 106. The flying camera 102 and the base station 104 are generally enabled to communicate with one another via an uplink channel 108 and a downlink channel 110. In some embodiments, the microphone 106 may be integrated into the controller 104. In some embodiments, the microphone 106 may be implemented as a separate device connected to the controller 104 by a wired or a wireless (e.g., BLUETOOTH, ZIGBEE, WiFi, etc.) interface. In various embodiments, the flying camera 102 may be implemented as an unmanned aerial vehicle (UAV), a drone, or a remotely piloted aircraft (RPA) having an integrated video camera. In some embodiments, the flying camera 102 may be implemented as an unmanned aerial vehicle (UAV), a drone, or a remotely piloted aircraft (RPA) having a video camera removably mounted (e.g., described in more detail below in connection with FIG. 2). The terms UAV, RPA, and drone as used herein are intended to encompass both fixed wing and copter style aircraft (or vehicle). However, the terms UAV, RPA, and drone should not be construed as excluding other types of aerial vehicles (e.g., dirigibles, etc.).

In various embodiments, one or more microphones 106 may be connected to the base station 104. In some embodiments, the microphone 106 may be implemented as a headset that may be worn by a pilot using the base station 104. In embodiments implementing the microphone 106 as a headset, the microphone 106 may communicate an audio signal to the base station 104 using one or more wired or wireless protocols. In embodiments implementing a wireless microphone connection, the microphone 106 may transmit a digital audio signal to the base station 104 via one or more wireless protocols (e.g., BLUETOOTH, ZIGBEE, WiFi, etc.). In embodiments implementing a wired microphone connection (not shown), the microphone 106 may provide an analog audio signal to the base station 104.

In various embodiments, the flying camera system enables the pilot to provide audio commentary while viewing the video captured and transmitted in real time from the flying camera 102. The real time audio commentary supplied by the pilot may capture emotions and thoughts conveyed by the pilot as the video is being captured and presented to the pilot. The flying camera system eliminates the burden on the pilot of remembering important commentary after the flight is completed and during post production video review and editing, especially since post production video review and editing may take place at a facility that is likely not at the same location as where the flight took place.

By integrating the capture of audio commentary into the base station 104, the pilot can focus on framing the scene, controlling camera parameters, and safely piloting the flying camera 102. The present invention generally relieves the pilot from having to control a separate audio capture device or otherwise record his/her thoughts, emotions, and commentary separately for subsequent dubbing of the recorded video during post production editing. In various embodiments, the base station 104 may be further configured to allow connection of an audio player device (e.g., MP3 player, cassette player, DAT player, compact disc (CD) player, thumb drive, etc.). For example, the base station 104 may comprise a universal serial bus (USB) port and/or an audio input port (e.g., 3.5 mm jack, etc.) that accepts digital or analog audio from a separate peripheral device (e.g., iPod®, MP3 player, or other discrete audio player).

In various embodiments, the base station 104 receives encoded video information, time stamp information associated with the encoded video information, and telemetry information from the flying camera 102 (e.g., via the downlink channel 110). The base station 104 transmits encoded audio information, time stamp information associated with the encoded audio information, and commands for controlling the flying camera 102 in real time to the flying camera 102 (e.g., via the uplink channel 108). The encoded audio information is generally associated with corresponding time stamp information received by the base station 104 from the flying camera 102 to facilitate synchronization of the encoded audio information with encoded video information recorded by the flying camera 102. In comparison to encoded video, encoded audio utilizes a vastly smaller bandwidth. In various embodiments, a standard WiFi or radio frequency (RF) transmitter/receiver system may be used to communicate a useable encoded audio stream from the base station 104 to the flying camera 102.

In various embodiments, a video encoding and audio-visual (AV) storage subsystem may be housed in the flying camera 102. The video encoding and audio-visual (AV) storage subsystem may be enabled to combine stored encoded video information generated by the onboard camera with encoded audio information subsequently received from the base station 104 into a single multimedia file (or container) stored on the flying camera 102. The encoded audio and encoded video information may be synchronized using time stamp information stored with the recorded video information and time stamp information received with the encoded audio information.

In some embodiments, the video encoding system may buffer the encoded video information until the time synchronized encoded audio is received and then multiplex the encoded audio with the encoded video. The combined audio and video data may then be placed in the onboard storage as a multimedia file. In some embodiments, the video encoding system may encode the video information with time stamps in a container or file. The container or file would then be accessed again when encoded audio has been received to find the applicable time stamp and write the corresponding encoded audio information to the appropriate location in the file. The activity of adding the encoded audio information may be performed concurrently with a separate process for appending further encoded video and time stamp information to the same file. In various embodiments, a transport layer of the uplink channel 108 may be implemented using a radio control (RC) protocol, a user datagram protocol (UDP), and/or a transmission control protocol (TCP). In one example, a TCP/IP protocol and/or voice over internet protocol (VOID) may be implemented. UDP is a connectionless protocol defined by industry-standards specifications RFC-768 and RFC-1122. UDP-messages are used to pass command line arguments and data between a controller (e.g., the base station 104) and a client (e.g., the flying camera 102). In embodiments implementing a UDP transport layer, the audio adding activity may be implemented as a standalone software application that runs in the background on the flying camera 102. Internet-type TCP messages, and other similar protocols, may also be used effectively for communication between the flying camera 102 and the base station 104. The audio adding activity may lie dormant until a UDP-message (or TCP-message) is received from the base station 104. When a message is received, the authority of the sender may be checked, the message parsed, and the relevant pieces sent to appropriate parts of the flying camera 102.

Figure 2:
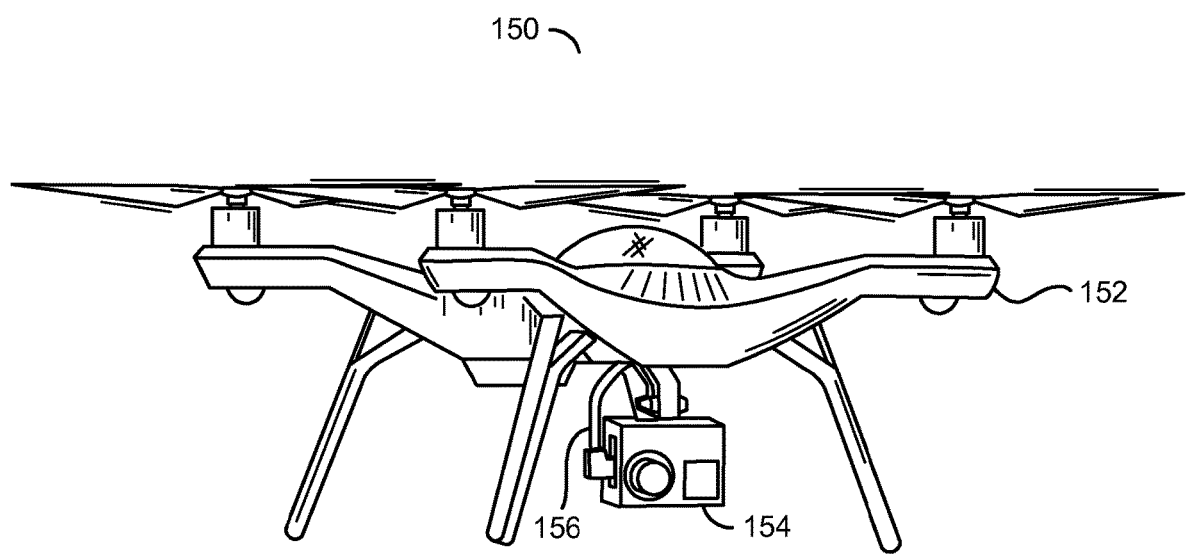
FIG. 2 is a diagram illustrating an example implementation of a camera and drone combination.

Referring to FIG. 2, a diagram is shown illustrating an example implementation of a drone with an externally mounted camera. In various embodiments, a flying camera 150 may be implemented using an unmanned aerial vehicle (UAV) 152 and a separate video camera 154. The video camera 154 may be removably mounted to the UAV 152. In some embodiments, the video camera 154 is mounted to a fixed stalk of the UAV 152. In other embodiments, the video camera 154 may be mounted to the UAV 152 using a gimbal assembly (not shown). In various embodiments, the UAV 152 may communicate with the camera 154 via a cable 156. The cable 156 may be implemented using one or more of a universal serial bus (USB), a high-definition multimedia interface (HDMI), or some other proprietary or non-proprietary connection capable of transferring audio information, control information, and/or encoded video information between the UAV 152 and the camera 154.

Figure 3:
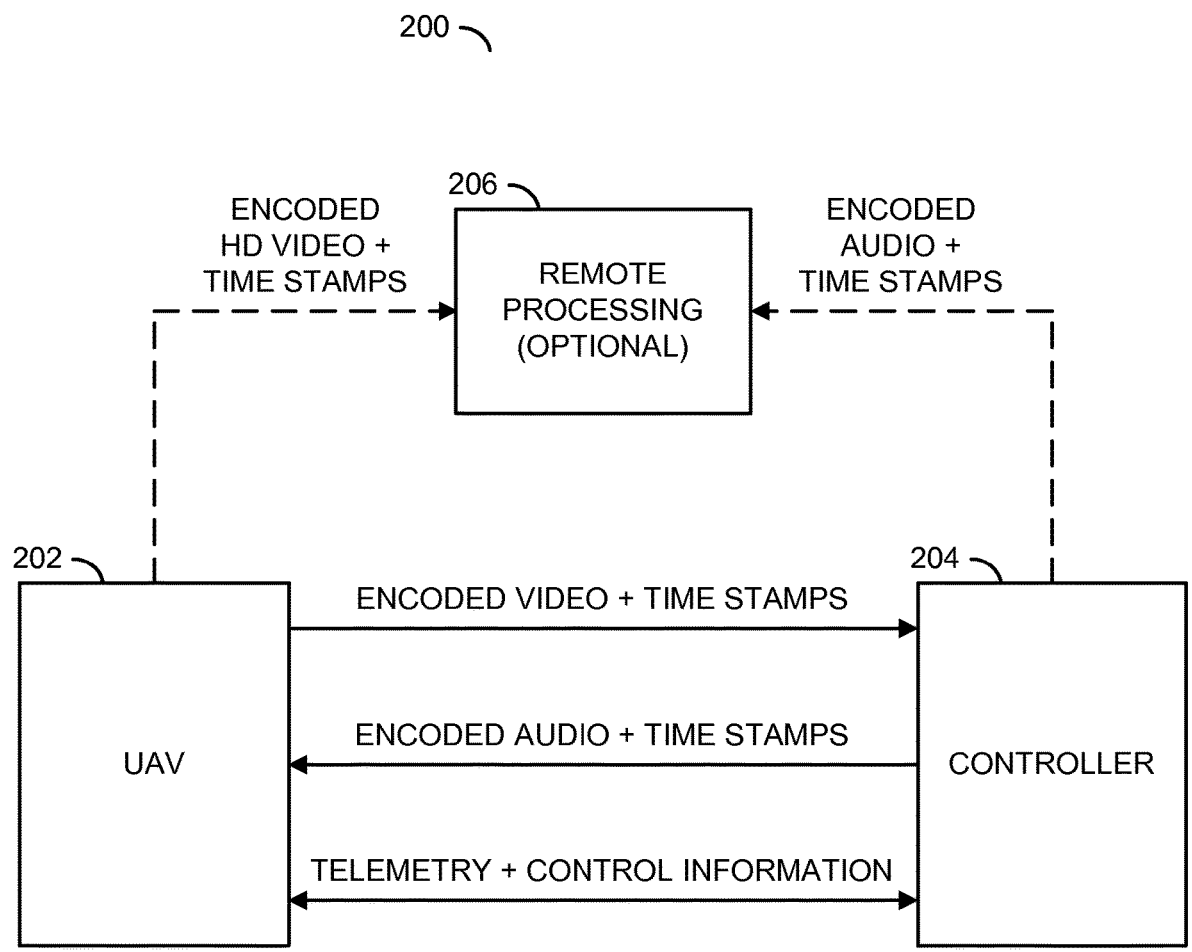
FIG. 3 is a diagram illustrating an example implementation of a system in accordance with embodiments of the present invention.

Referring to FIG. 3, a diagram is shown illustrating an example implementation of a system in accordance with an embodiment of the present invention. In one example, a system 200 implemented in accordance with an embodiment of the invention may comprise a drone (or UAV) 202 and a ground controller (or base station) 204. In various embodiments, encoded video and time stamp information is communicated from the drone 202 to the controller 204 and encoded audio and time stamp information is communicated from the controller 204 to the drone 202. In various embodiments, the encoded video information sent from the drone 202 to the controller 204 may comprise a lower resolution/bitrate mobile stream (e.g., VGA, WVGA, QVGA, SD, HD, etc.). Telemetry and control information is also exchanged between the drone 202 and the controller 204.

In some embodiments, an optional remote processing module 206 may also be implemented. In embodiments implementing the remote processing module 206, high resolution/bitrate (e.g., HD, Ultra HD, 4K, etc.) encoded video and time stamp information may be sent to the remote processing module 206 in addition to, or in place of, being stored on the drone 202. When the high resolution encoded video and time stamp information is sent to the remote processing module 206, the encoded audio and time stamp information generated by the controller 204 may also be communicated to the remote processing module 206. The remote processing module 206 may be configured to generate a multimedia container or file by combining the high resolution encoded video from the drone 202 with the encoded audio from the controller 204 based on the time stamp information received from both the drone 202 and the controller 204. In some embodiments, the audio-video (AV) material multiplexed by the drone 202 may be transmitted to a network (e.g., a 4G network, etc.) instead of stored locally. In one example, the multiplexed audio-video (AV) material may be either broadcast as a live event or recorded to a remote recording station.

Figure 4:
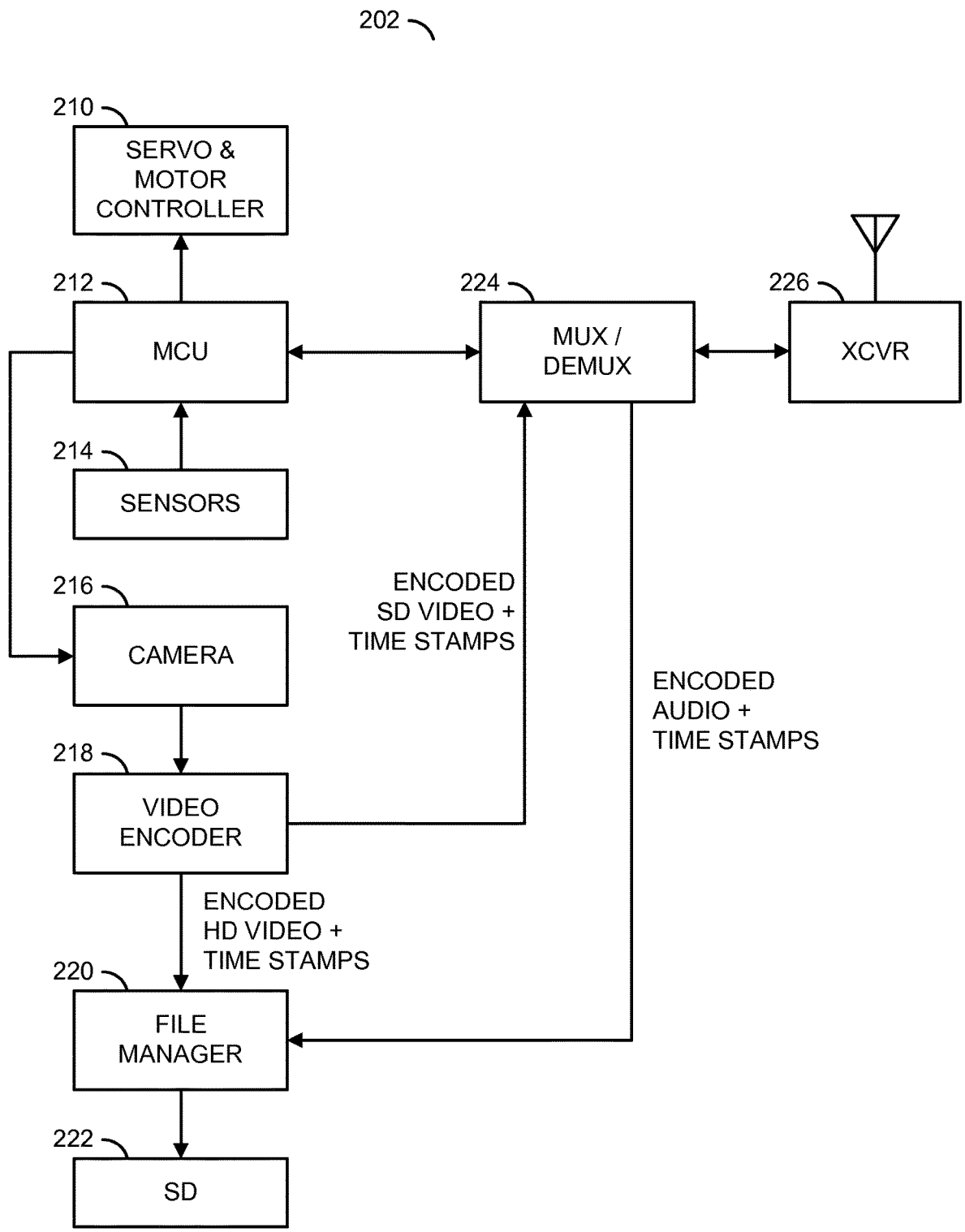
FIG. 4 is a diagram illustrating an example implementation of a flying camera in accordance with an embodiment of the present invention.

Referring to FIG. 4, a diagram is shown illustrating an example implementation of a flying camera in accordance with an embodiment of the present invention. In an example embodiment, the drone 202 may comprise a servo and motor controller 210, a micro-controller (MCU) 212, one or more sensors 214, a camera 216, a video encoder (or acquisition) block 218, a file manager 220, a removable storage medium 222, a multiplexing/demultiplexing circuit 224, and a transceiver 226. The servo and motor controller 210 may be configured to control one or more servo actuators and/or one or more motors. The MCU 212 may be configured to control the servo and motor controller 210, the camera 216 and the multiplexing/demultiplexing circuit 224. The MCU 212 may receive information from the one or more sensors 214. The one or more sensors 214 may include, but are not limited to a gyroscope, an accelerometer, a magnetometer, a barometer, a camera, and sonar. In one example, the one or more sensors 214 and the camera 216 may be coupled to the MCU 212 using one or more inter-IC control ($I^2c$) interfaces or other serial interfaces (e.g., SSI, SPI, UART, etc.).

The camera 216 may be coupled to the video encoder 218. In various embodiments, the video encoder 218 may generate multiple video streams from the video data received from the camera 216. In various embodiments, the video encoder 218 may encode (compress) the video data using, for example, H.264, H.265, MJPEG, MPEG4, or other compression scheme. In one example, the video encoder 218 may generate a first, high resolution (e.g., HD, Ultra HD, 4K, etc.) encoded video stream and a second, lower resolution (e.g., VGA, WVGA, QVGA, SD, HD, etc.) video stream, along with time stamp information. The high resolution video stream and time stamp information may be presented to the file manager 220. The lower resolution video stream and time stamp information may be presented to the multiplexing/demultiplexing circuit 224. The file manager 220 may be coupled to the removable storage medium 222 using, for example, a serial interface, a SD interface, eMMC, NAND, SDIO, USB Host, etc. The multiplexing/demultiplexing circuit 224 may be configured to communicate (i) commands from the transceiver 226 to the MCU 212, (ii) encoded video and time stamp information from the video encoder 218 to the transceiver 226, (iii) telemetry information from the MCU 212 to the transceiver 226, and (iv) encoded audio and time stamp information from the transceiver 226 to the file manager 220. The file manager 220 may be configured to store a multimedia file containing the encoded audio and the encoded video information on the removable storage medium 222. The file manager 220 may be further configured to synchronize the encoded audio and encoded video information on the removable storage medium 222 using the time stamp information.

Figure 5:
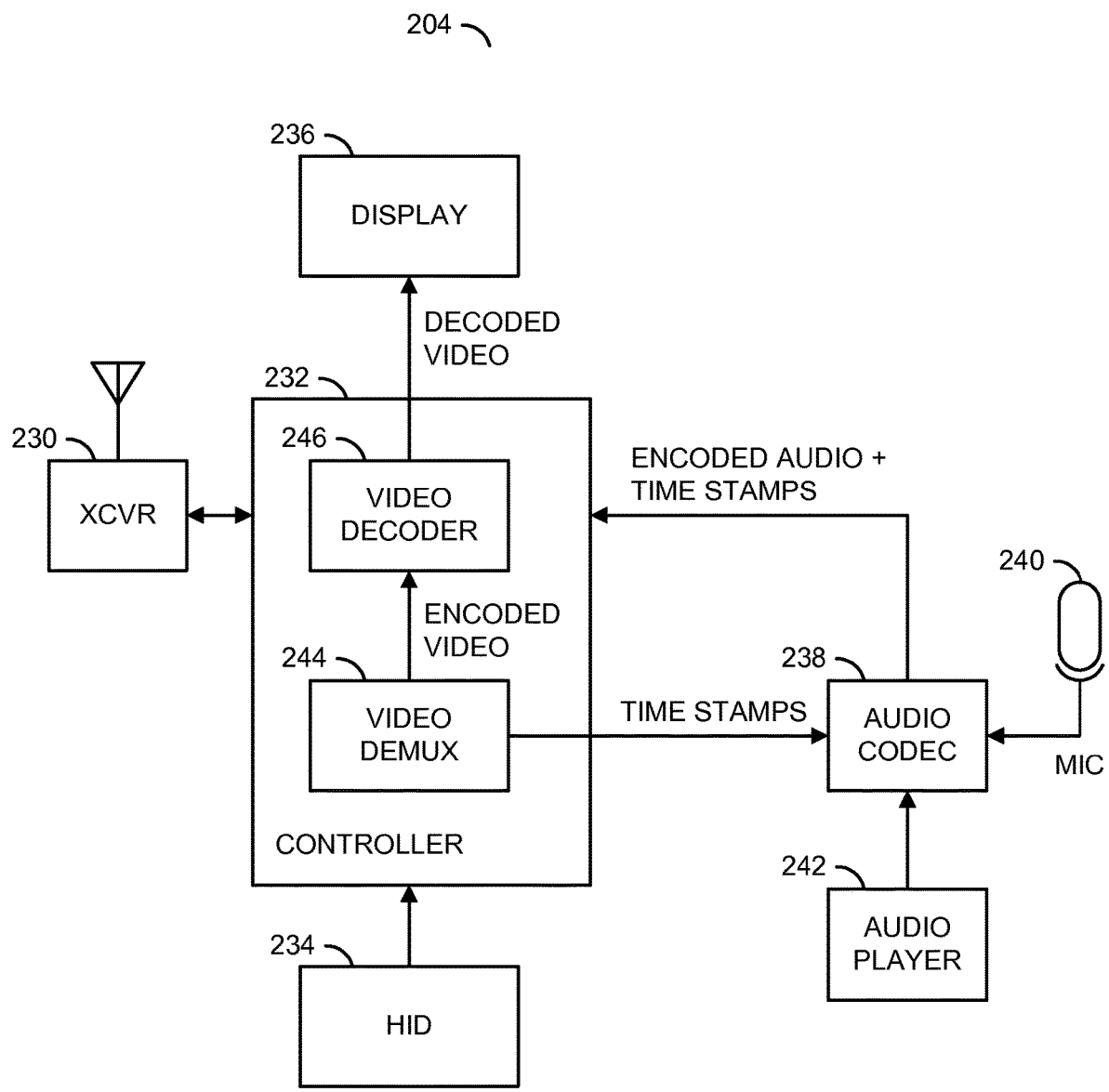
FIG. 5 is a diagram illustrating an example implementation of a flying camera controller in accordance with an embodiment of the present invention.

Referring to FIG. 5, a diagram is shown illustrating an example implementation of a flying camera controller in accordance with an embodiment of the present invention. In an example embodiment, the ground controller (or base station) 204 may comprise a transceiver 230, a controller 232, a human interface device (HID) 234, a display 236, and an audio encoder-decoder (codec) 238. The audio codec 238 may connect to one or more of a microphone 240 and an audio player/device 242. In one example, the controller 232 may include a video demultiplexer 244 and a video decoder 246. In various embodiments, the controller 232 may be coupled to the HID 234, the display 236, the audio codec 238 and the transceiver 230. In some embodiments, the controller 232 may include the audio codec 238. The HID 234 may include, but is not limited to, a keyboard, a mouse, a joystick, a touch pad, a touch screen, etc. The display 236 may comprise, but is not limited to, a dedicated video display or a smart device (e.g., cellular telephone, tablet computer, touch screen, etc.).

The controller 232 may be configured to demultiplex encoded video and time stamp information received from the transceiver 230 (e.g., using the demultiplexer 244) and decode the encoded video information (e.g., using the video decoder 246). The decoded video information may be sent to the display 236 for presentation to a pilot. The time stamp information may be sent to the audio codec 238 for combination with encoded audio information. The controller 232 may be configured to convert input signals from the HID 234 into commands for the drone 202 and the camera 216.

The audio codec 238 may be configured to encode audio received from the microphone 240 and/or the audio player 242, and associate the encoded audio with the incoming time stamp information corresponding to the decoded video information being displayed on the display 236. The controller 232 may be further configured to transmit the control information, the encoded audio information and the associated time stamp information back to the drone 202 using the transceiver 230. The microphone 240 may be coupled to the audio codec 238 by either a wired (e.g., analog, USB, etc.) interface or a wireless (e.g., BLUETOOTH, ZIGBEE, Wifi, etc.) interface. The audio player 242 may be connected to the audio codec 238, in one example, by either a wired (e.g., analog, USB, etc.) interface or a wireless (e.g., BLUETOOTH, ZIGBEE, Wifi, etc.) interface. In some embodiments, the ground controller 204 includes an audio jack facilitating the connection to the audio player 242.

In various embodiments, Ultra-HD encoded video may be stored in the local storage on the drone 202 and a smaller (but still HD) stream may be sent to the ground controller 204. In some embodiments, the drone 202 may generate Full HD encoded video at the drone and send the Full HD stream to the ground controller 204 for real time pilot viewing. In some embodiments where Full HD encoded video is sent to the ground controller 204, the ground controller 204 may be configured to multiplex the encoded audio with the encoded video and send the multiplexed AV stream back to the drone for storage. In some embodiments where Full HD encoded video is sent to the ground controller 204, the ground controller 204 may be configured to store the multiplexed AV stream in a removable storage system (e.g., SD card, micro SD card, CF card, etc.) or a non-removable storage system (e.g., HDD, SSD, eMMC, etc.) of the ground controller 204.

Figure 6:
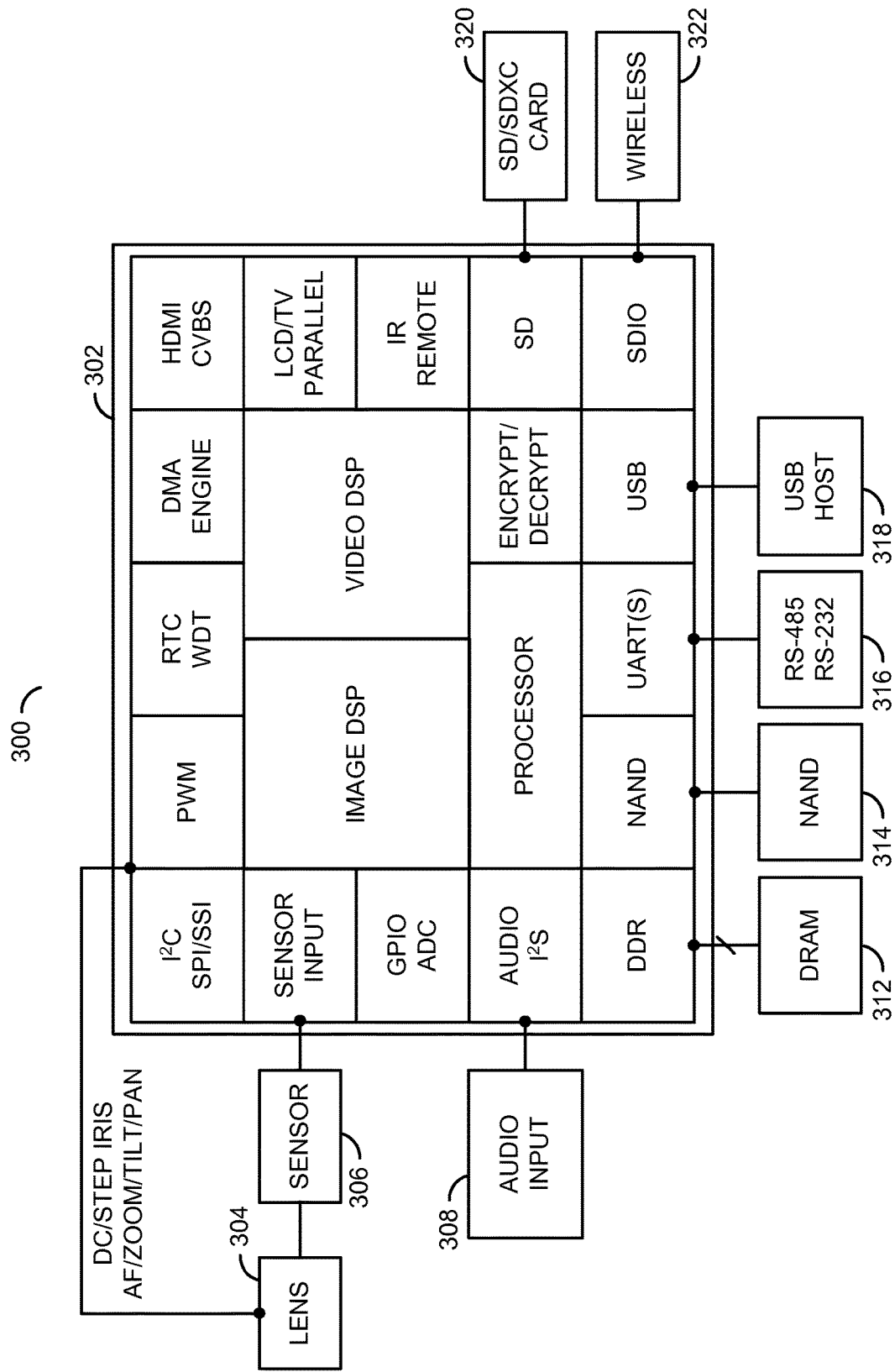
FIG. 6 is a diagram illustrating an example implementation of a camera/recorder system in accordance with an embodiment of the present invention.

Referring to FIG. 6, a diagram of a camera system 300 is shown illustrating an example implementation of a camera/recorder system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300. In one example, the camera system 300 may comprise a processor/camera chip (or circuit) 302, a lens assembly 304, an image sensor 306, an audio input circuit 308, which may include an optional audio codec, dynamic random access memory (DRAM) 312, non-volatile memory (e.g., NAND flash memory) 314, one or more serial interfaces 316, an interface 318 for connecting to or acting as a USB host, an interface for connecting to a removable media 320 (e.g., SD, SDXC, etc.), and a wireless interface 322. The wireless interface 322 and/or the USB Host 318 may be configured for communicating with the flying camera controller wirelessly.

The processor/camera circuit 302 may include a number of modules including a pulse width modulation (PWM) module, a real time clock and watch dog timer (RTC/WDT), a direct memory access (DMA) engine, a high-definition multimedia interface (HDMI), an LCD/TV/Parallel interface, a general purpose input/output (GPIO) and analog-to-digital converter (ADC) module, an infrared (IR) remote interface, a secure digital input/output (SDIO) interface, an SD card interface, an image sensor interface, and one or more of an inter-IC sound (I²S) interface, an inter-IC control (I²C) interface, and synchronous data communications interfaces (e.g., SPI, SSI, etc.). The circuit 302 may also include one or more embedded processors (e.g., ARM, etc.), an encryption/decryption block, an image digital signal processor (DSP), and a video DSP. The circuit 302 may be configured (e.g., programmed) to control the lens assembly 304 and the image sensor 306. The circuit 302 may receive raw image data from the sensor 306. The circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The circuit 302 may receive encoded and/or uncoded (e.g., raw) audio data from the audio input 308. The circuit 302 may also receive encoded audio data from the USB and/or SDIO interfaces. The circuit 302 may provide encoded video data to the wireless interface 322 (e.g., using the SDIO interface and/or the USB interface). The wireless interface 322 may include support for wireless communication by one or more wireless and/or cellular protocols such as BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The circuit 302 may also include support for communication using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

Figure 7:
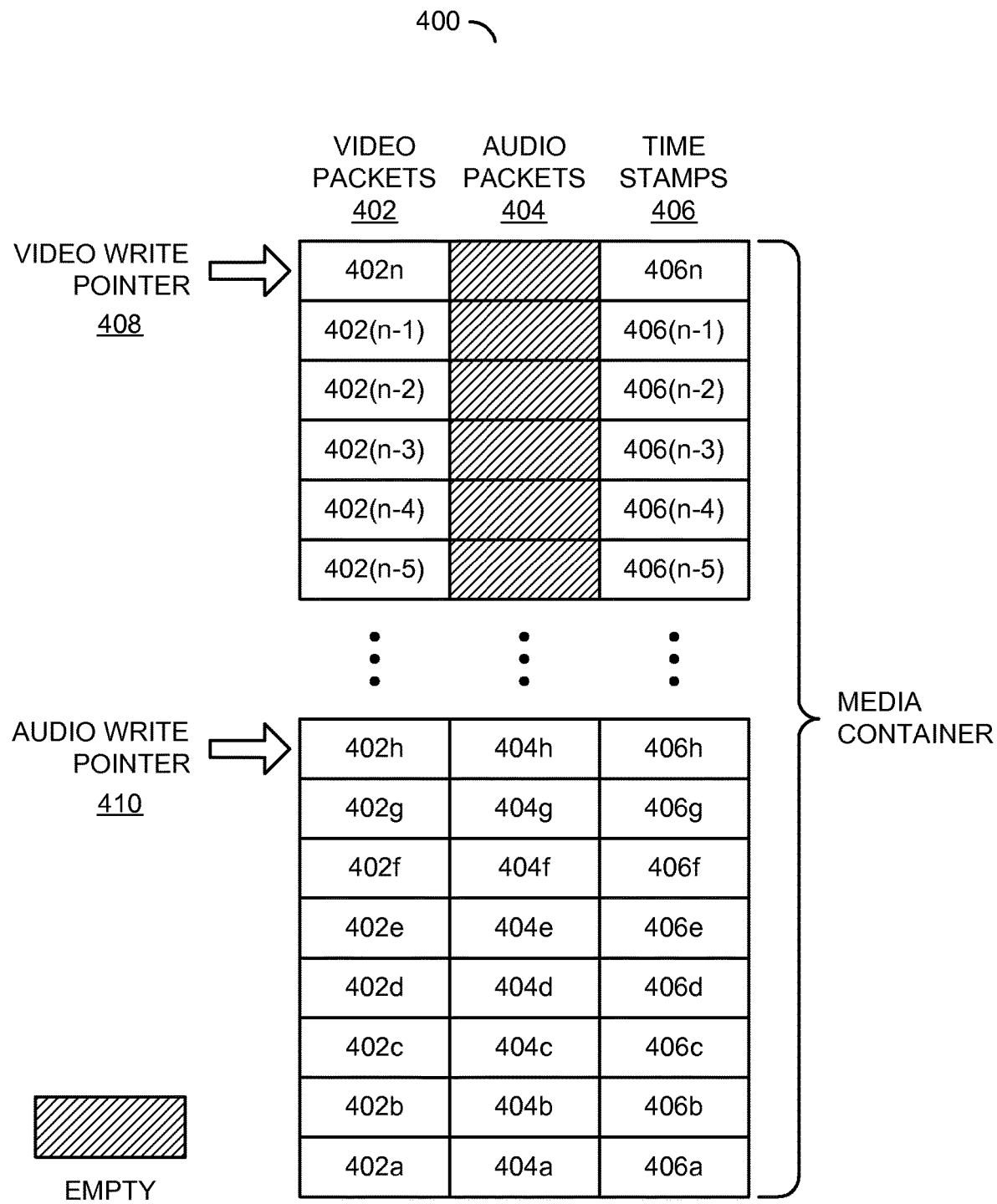
FIG. 7 is a diagram illustrating a process in accordance with an example embodiment of the present invention for creating a media container.

Referring to FIG. 7, a diagram is shown illustrating a process in accordance with an example embodiment of the invention for creating a media container. In various embodiments, the camera subsystem may capture and encode video information in real time and place the encoded video information with time stamps in a media container. In one example, the media container may be represented as a file 400 onboard a removable storage system (e.g., SD card, micro SD card, CF card, etc.) or a non-removable storage system (e.g., HDD, SSD, eMMC, etc.) of the flying camera 102, the drone 202, or the ground controller 204. The file 400 containing video and time stamps may be accessed again when audio has been received by the flying camera 102. In one example, the file 400 may be configured to store video packets 402, audio packets 404 and time stamps 406. A video write pointer 408 and an audio write pointer 410 may be implemented to indicate a current write position in the file 400 for each type of data.

Video captured in real time may be stored as a number of video packets 402a-402n and associated time stamps 406a-406n. The time stamps 406a-406n may be transmitted along with associated video information to the base station 104. The time stamps 406a-406n may be associated with audio information captured by the base station 104. The base station 104 may then transmit the audio information and associated time stamps 406a-406n to the flying camera 102.

Upon receiving audio information with an associated time stamp, the system may parse the file 400 to find the applicable time stamp 406a-406n and write the audio information received at the corresponding location (e.g., pointed to by the audio write pointer 410). An amount by which the audio write pointer 410 lags behind the video write pointer 408 is generally related to a latency of the downlink and uplink channels. The process of writing audio information may be concurrent with a separate process appending further video and time stamp information to the same file. A similar process to the one described above may be implemented by the remote processing module 206 described in connection with FIG. 3 above.

Figure 8:
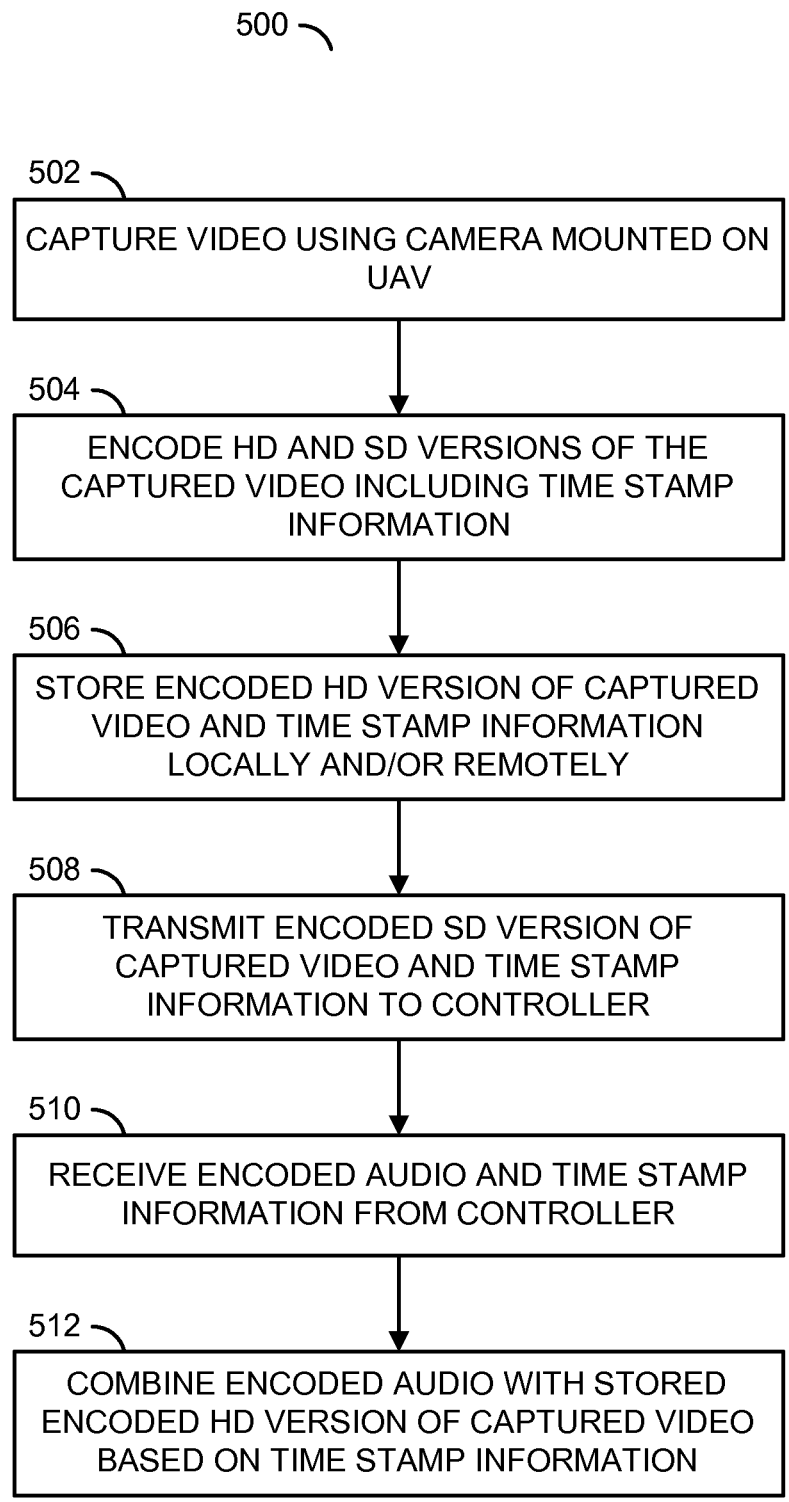
FIG. 8 is a flow diagram illustrating a process in accordance with an example embodiment of the present invention for combining flying camera video with synchronized audio content.

Referring to FIG. 8, a flow diagram is shown illustrating a process 500 in accordance with an example embodiment of the invention for combining flying camera video with synchronized audio content. In one example, the process (or method) 500 may comprise a step (or state) 502, a step (or state) 504, a step (or state) 506, a step (or state) 508, a step (or state) 510, and a step (or state) 512. In the step 502, the process 500 captures video data using a camera mounted on an unmanned aerial vehicle (UAV). In the step 504, the process 500 encodes multiple versions of the captured video data. In one example, the multiple versions include a first, higher resolution/bitrate (e.g., HD, Ultra HD, etc.) encoded video stream and a second, lower resolution/bitrate (e.g., SD, etc.) encoded video stream. The encoded video streams include time stamp information. In the step 506, the process 500 stores the higher resolution/bitrate encoded video stream and time stamp information in a local memory and/or transmits the higher resolution/bitrate encoded video stream and time stamp information to a remote storage facility (e.g., for security). In the step 508, the process 500 transmits the lower resolution/bitrate encoded video stream and time stamp information to a controller (or base station). In the step 510, the process 500 receives the encoded audio and time stamp information from the controller. In the step 512, the process 500 combines the higher resolution/bitrate encoded video data (stored either locally or remotely) with the encoded audio data received from the controller based on the time stamp information.

Figure 9:
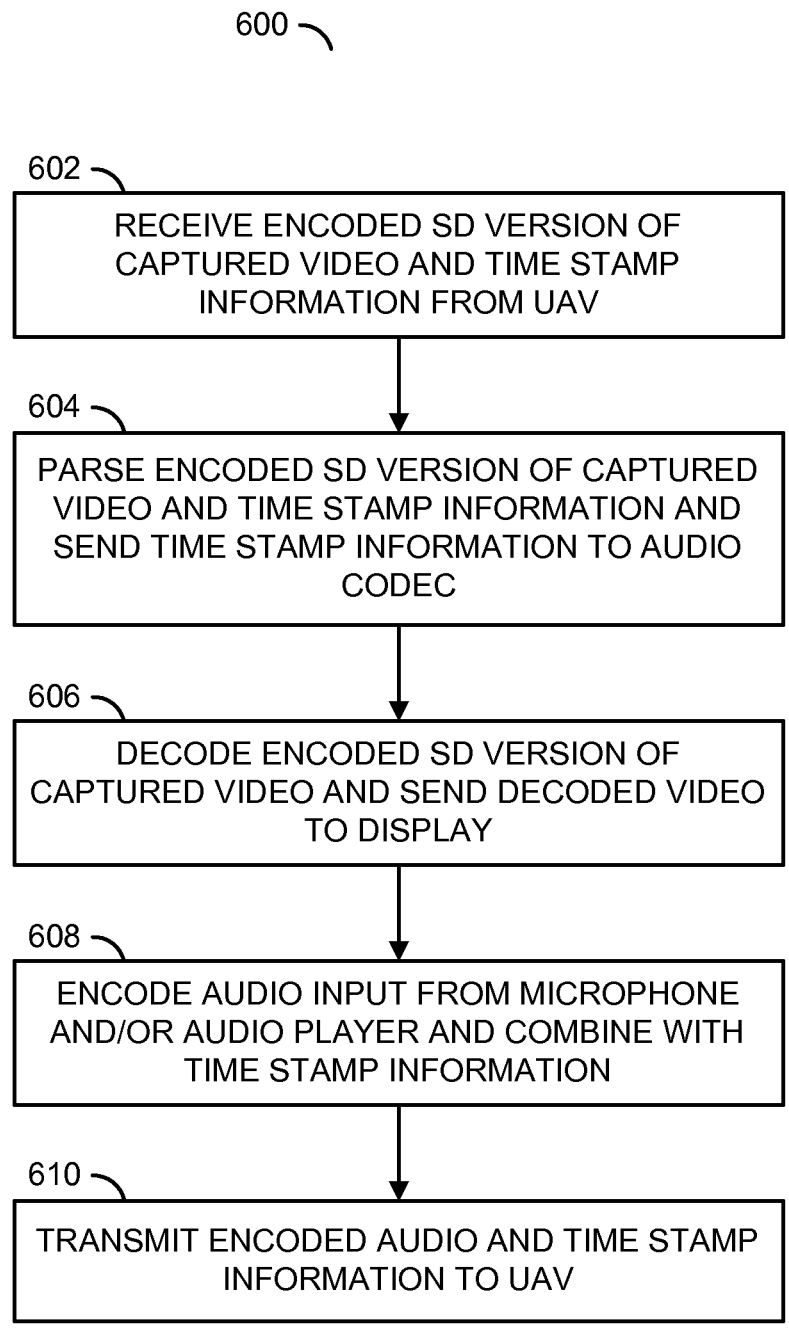
FIG. 9 is a flow diagram illustrating a process in accordance with an example embodiment of the present invention for generating synchronized audio content.

Referring to FIG. 9, a flow diagram is shown illustrating a process 600 in accordance with an example embodiment of the present invention for generating synchronized audio content. In one example, the process (or method) 600 may comprise a step (or state) 602, a step (or state) 604, a step (or state) 606, a step (or state) 608, and a step (or state) 610. In the step 602, the process 600 receives the lower resolution/bitrate encoded video data and time stamp information from the unmanned aerial vehicle (UAV). In the step 604, the process 600 parses the encoded video data and time stamp information and sends the time stamp information to an audio codec of the controller. In the step 606, the process 600 decodes the encoded video data and sends the decoded video data to a display for presentation to a pilot using the controller. In the step 608, the process 600 encodes audio data from a microphone and/or an audio player and combines the encoded audio data with the time stamp information received from the UAV. In the step 610, the process 600 transmits the encoded audio data and associated time stamp information to the UAV. The process 600 generally performs the steps 606, 608, and 610 concurrently.

In various embodiments, the present invention advantageously allows a real time audio commentary overlay or even music to be added to the captured video in real time rather than later in post production. The real time audio commentary supplied by a pilot contemporaneously captures emotions and thoughts conveyed by the pilot as the video is being captured and presented. The pilot does not need to remember important commentary after the flight has completed and during post production video review and editing at a facility that is likely not at the same location as where the flight took place.

If the video editor and post producer are two different people, the present invention is advantageous in that the pilot does not need to remember and/or communicate important details of the flight to the video editor after the flight session is over and when the video editor has started his or her task. At a later time, the pilot that captured the video may be unable to describe the flight in comparable detail or with comparable emotion to when the actual flight event took place.

The two events, flight video capture and video post processing, may not only be in different locations but may occur at different points in time. For example, the pilot may have a long and time consuming commute to the filming location. Recalling important events that occurred during the flight may be difficult at a later time.

Video editing is time consuming and involves a skill set differing from the skill set of a UAV pilot. It would not be unreasonable for a UAV pilot to out source the editing task to a paid professional. Thus, a reduction in the cost of producing a video file with overlaid audio that is ready for consumption may be realized by implementing a flying camera system in accordance with an embodiment of the invention.

The functions illustrated by the diagrams of FIG. 7-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multichip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a transceiver circuit configured to receive an uplink channel from a remote location and transmit a downlink channel to said remote location; and
a first controller circuit configured to
(i) control operation of an unmanned aerial vehicle and a camera in response to commands received via said uplink channel,
(ii) capture video data from said camera,
(iii) generate a first encoded video stream having a first resolution,
(iv) generate a second encoded video stream having a second resolution,
(v) generate time stamp information,
(vi) associate said time stamp information with said first encoded video stream and said second encoded video stream,
(vii) store said first encoded video stream with said associated time stamp information on a storage medium,
(viii) transmit said second encoded video stream with said associated time stamp information to said remote location via said downlink channel,
(ix) receive an encoded audio stream from said remote location via said uplink channel, wherein said encoded audio stream comprises encoded audio information associated with said time stamp information that was generated by said first controller circuit, associated with said second encoded video stream, and previously transmitted to said remote location with said second encoded video stream, and
(x) combine said encoded audio information with said first encoded video stream stored on said storage medium by matching said associated time stamp information received with the encoded audio information with said associated time stamp information stored with the first encoded video stream on said storage medium.

2. The apparatus according to claim 1, wherein said camera is integrated with said unmanned aerial vehicle.

3. The apparatus according to claim 1, wherein said camera is removably mounted on said unmanned aerial vehicle.

4. The apparatus according to claim 1, wherein said commands, said encoded audio information, and said associated time stamp information are communicated using at least one of a user datagram protocol (UDP) transport layer or a transmission control protocol (TCP) transport layer.

5. The apparatus according to claim 1, wherein said first controller circuit is further configured to transmit navigation information via said downlink channel.

6. The apparatus according to claim 1, further comprising a base station located remotely from said first controller circuit, said base station comprising a second controller circuit, a display, and a microphone, wherein said second controller circuit is configured to receive said downlink channel and transmit said uplink channel.

7. The apparatus according to claim 6, wherein said second controller circuit is further configured to:
receive said second encoded video stream and said associated time stamp information transmitted by said first controller circuit via said downlink channel;
decode said second encoded video stream received from said first controller circuit to obtain a decoded video stream and a copy of said time stamp information associated with said second encoded video stream;
display said decoded video stream on said display;
generate said encoded audio information by encoding an audio signal received from said microphone while said decoded video stream is being presented on said display;
associate said encoded audio information with said copy of said time stamp information associated with said second encoded video stream received from said first controller circuit that corresponds with the decoded video stream being displayed; and
transmit said encoded audio stream comprising the encoded audio information and said copy of said time stamp information associated with said second encoded video stream received from said first controller circuit to said first controller circuit via said uplink channel.

8. The apparatus according to claim 6, wherein said microphone is connected to said second controller circuit by either a wired interface or a wireless interface.

9. The apparatus according to claim 7, wherein said second controller circuit is further configured to receive an audio input signal from an audio player device via at least one of a wired interface and a wireless interface.

10. The apparatus according to claim 9, wherein said second controller circuit is further configured to:
combine said audio input signal received from said audio player device and said audio signal received from said microphone;
generate said encoded audio information by encoding the combined audio signals; and
transmit said encoded audio information along with the copy of said time stamp information associated with said second encoded video stream received from the first controller circuit to said first controller circuit via said uplink channel.

11. A method of providing real time audio content to flying camera video comprising:
capturing video data using a camera mounted to an unmanned aerial vehicle;
generating a first encoded video stream having a first resolution;
generating a second encoded video stream having a second resolution;
generating time stamp information;
associating said time stamp information with said first encoded video stream and said second encoded video stream;
storing the first encoded video stream with said associated time stamp information on a storage medium housed within at least one of said unmanned aerial vehicle and a remote facility;
transmitting said second encoded video stream with said associated time stamp information from said unmanned aerial vehicle to a base station via a downlink channel;
receiving said second encoded video stream and said associated time stamp information from said unmanned aerial vehicle via a wireless interface at said base station;
parsing said second encoded video stream and said associated time stamp information;
decoding said second encoded video stream to obtain decoded video data and a copy of said time stamp information associated with said second encoded video stream;

displaying the decoded video data on a display of the base station;

generating encoded audio information by encoding audio received from at least one of a microphone and an audio player device;

associating the encoded audio information with said copy of said time stamp information associated with said second encoded video stream received from said unmanned aerial vehicle that corresponds with the decoded video data being displayed; and transmitting an encoded audio stream comprising the encoded audio information and said copy of said time stamp information associated with said second encoded video stream to the unmanned aerial vehicle via an uplink channel;

receiving the encoded audio stream from the base station via the uplink channel, wherein said encoded audio stream comprises the encoded audio information associated with said time stamp information that was (i) generated by said unmanned aerial vehicle, (ii) associated with said second encoded video stream, and (iii) previously transmitted from said unmanned aerial vehicle to said base station with said second encoded video stream; and combining said encoded audio information with said first encoded video stream stored on said storage medium by matching said associated time stamp information received with the encoded audio information with said associated time stamp information stored with said first encoded video stream on said storage medium.

12. The method according to claim 11, wherein said camera is removably mounted to said unmanned aerial vehicle.

13. The method according to claim 11, wherein said encoded audio information and said associated time stamp information are communicated using at least one of a user datagram protocol (UDP) transport layer or a transmission control protocol (TCP) transport layer.

14. The method according to claim 11, wherein said audio is received from said microphone by either a wired interface or a wireless interface.

15. The method according to claim 14, wherein said microphone is part of a headset.

16. The method according to claim 11, wherein said audio is received from said audio player device via at least one of a wired interface and a wireless interface.

17. The method according to claim 11, further comprising:

mixing a first audio signal received from said audio player device and a second audio signal generated by said microphone.

18. The method according to claim 11, wherein said audio player device comprises at least one of an MP3 player, a cassette player, digital audio tape (DAT) player, a compact disc (CD) player, and a thumb drive.

19. The apparatus according to claim 1, wherein said encoded audio information and said first encoded video stream are combined on said storage medium independently of a latency of said uplink and said downlink channels.

* * * * *